United States Patent
Heise et al.

(10) Patent No.: US 8,027,379 B2
(45) Date of Patent: Sep. 27, 2011

(54) MONITORING AND ADJUSTING NOISE PARAMETERS

(75) Inventors: Bernd Heise, Munich (DE); Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 853 days.

(21) Appl. No.: 11/954,973

(22) Filed: Dec. 12, 2007

(65) Prior Publication Data

US 2008/0165905 A1 Jul. 10, 2008

Related U.S. Application Data

(60) Provisional application No. 60/879,679, filed on Jan. 10, 2007.

(51) Int. Cl.
*H04B 3/46* (2006.01)

(52) U.S. Cl. ........ 375/227; 375/219; 375/226; 375/254; 375/316; 375/346; 714/795; 714/796

(58) Field of Classification Search ............... 375/135, 375/150, 219, 226, 227, 59, 260, 262, 267, 375/271, 295, 299, 306, 316, 322, 329, 340, 375/342, 345, 350
See application file for complete search history.

(56) References Cited

U.S. PATENT DOCUMENTS

| | | | |
|---|---|---|---|
| 6,920,194 B2 * | 7/2005 | Stopler et al. | 375/349 |
| 7,093,188 B2 * | 8/2006 | Maiuzzo et al. | 714/795 |
| 7,630,448 B2 * | 12/2009 | Zhidkov | 375/260 |
| 7,899,124 B2 * | 3/2011 | Heise et al. | 375/254 |
| 2007/0280339 A1 * | 12/2007 | Oksman | 375/222 |
| 2010/0208842 A1 * | 8/2010 | Tzannes | 375/296 |

* cited by examiner

*Primary Examiner* — Shuwang Liu
*Assistant Examiner* — Hirdepal Singh
(74) *Attorney, Agent, or Firm* — Eschweiler & Associates, LLC

(57) ABSTRACT

One embodiment of the present invention relates to a method of monitoring impulse noise. In the method, clusters of corrupted symbols in a stream of symbols are characterized in accordance with a cluster parameter associated with the clusters. Other methods and systems are also disclosed.

14 Claims, 6 Drawing Sheets

US 8,027,379 B2

MONITORING AND ADJUSTING NOISE PARAMETERS

REFERENCE TO RELATED APPLICATIONS

This application claims the benefit of U.S. Provisional Application No. 60/879,679, filed Jan. 10, 2007 the contents of which are herein incorporated by reference in their entirety.

FIELD OF THE INVENTION

The present invention relates generally to communication systems, and more particularly to communication systems for combating noise.

BACKGROUND OF THE INVENTION

Impulse noise consists of short powerful bursts that may adversely affect communication systems by disrupting communication signals exchanged is between the network devices of the system. The impulse noise bursts can either appear at random time intervals or at periodic time intervals. One particular type of impulse noise may be referred to as repetitive impulse noise (REIN).

In communication systems that communicate over a multi-carrier communication channel via symbols, impulse noise usually results in clusters of corrupted symbols. These clusters may be either consecutive symbols or randomly distributed symbols. In order to combat impulse noise and prevent corrupted symbols, the network devices of a communication system may utilize an impulse noise protection (INP) parameter. This INP parameter may dictate the extent to which the network devices need to adapt their transmissions to limit the effect of impulse noise on any communications.

However, existing solutions do not sufficiently address how to characterize impulse noise or determine this INP parameter. Therefore, improved methods and systems are needed.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

One embodiment of the present invention relates to a method of monitoring impulse noise. In the method, clusters of corrupted symbols in a stream of symbols are characterized in accordance with a cluster parameter associated with the clusters.

The following description and annexed drawings set forth in detail certain illustrative aspects and implementations of the invention. These are indicative of is but a few of the various ways in which the principles of the invention may be employed.

DRAWINGS

Figure 1:
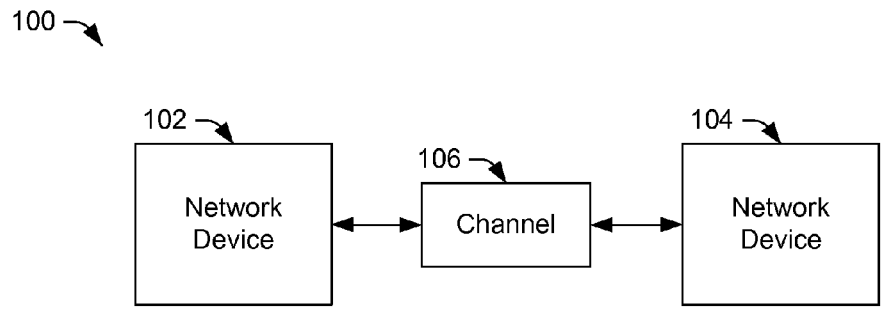
Figure 2:
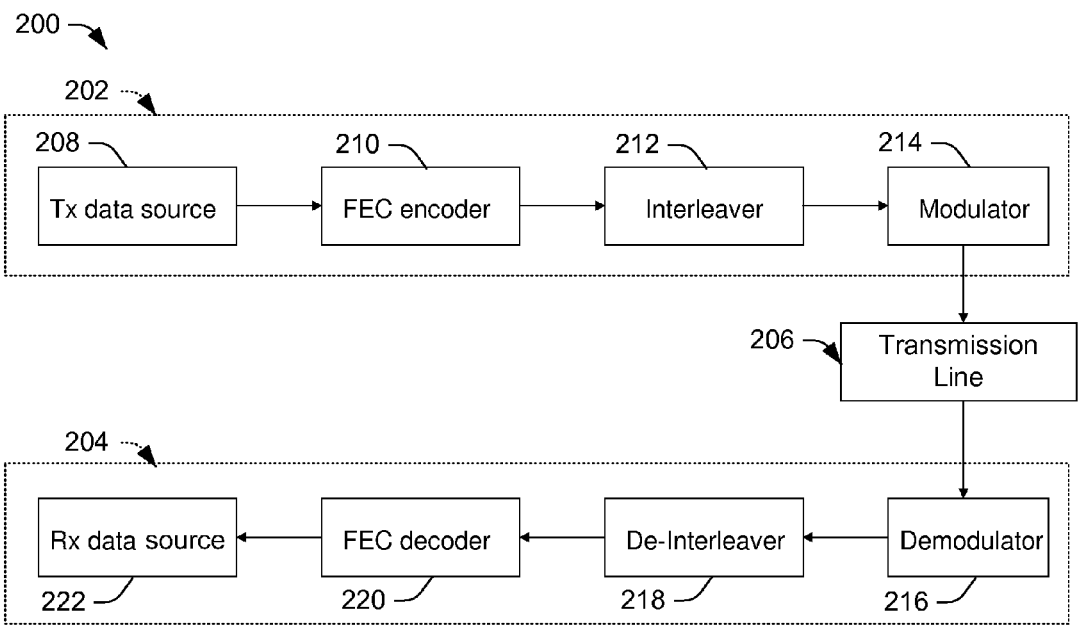
Figure 3:
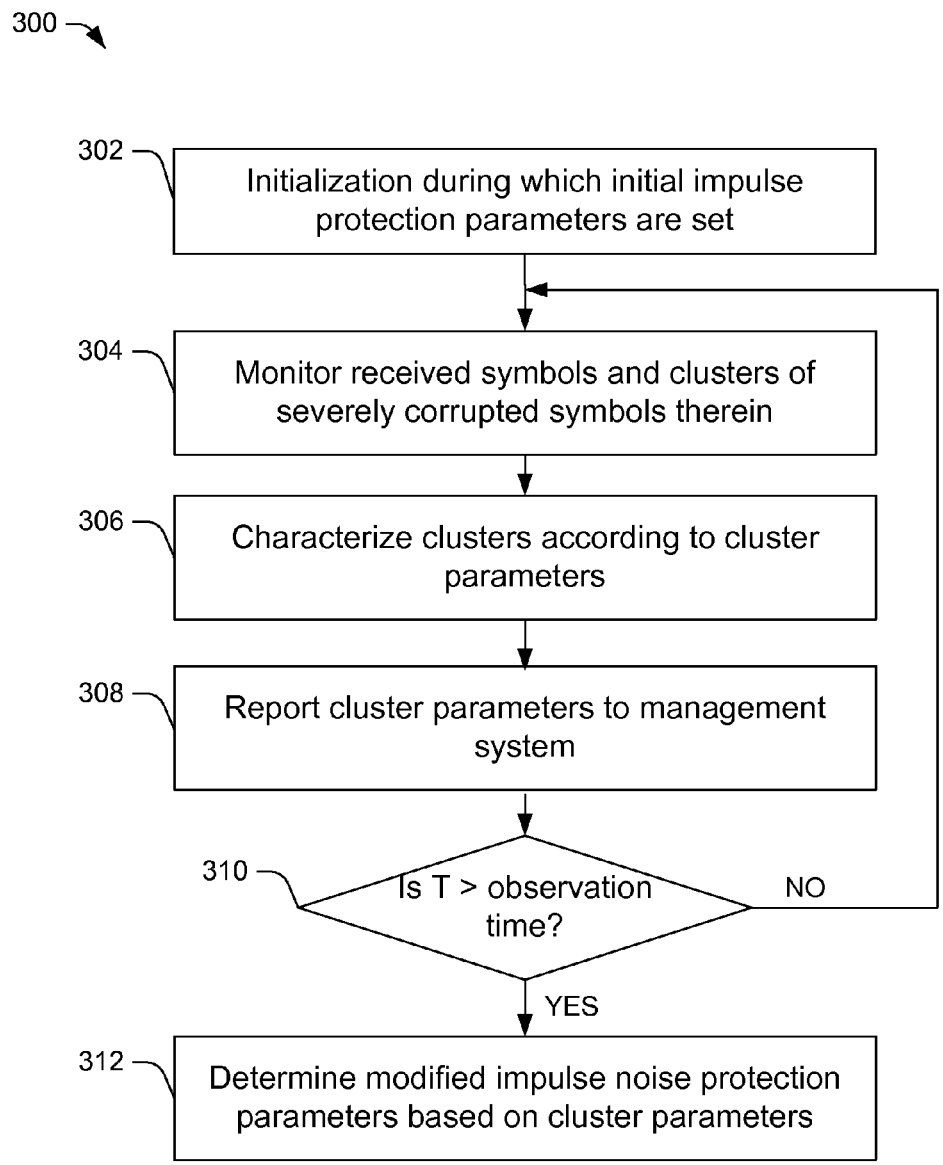
Figure 4:
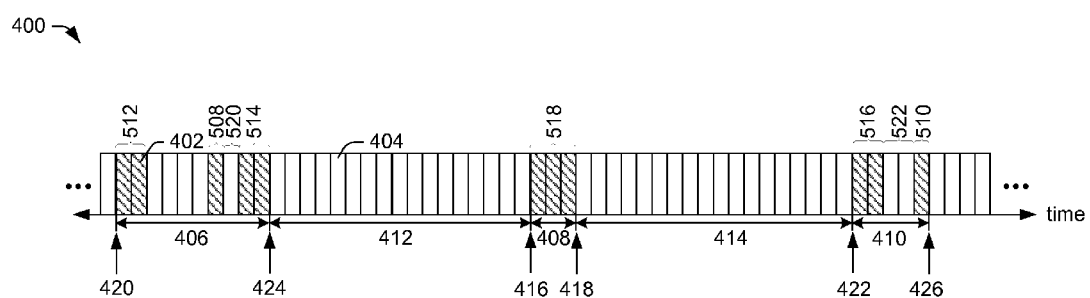
Figure 5:
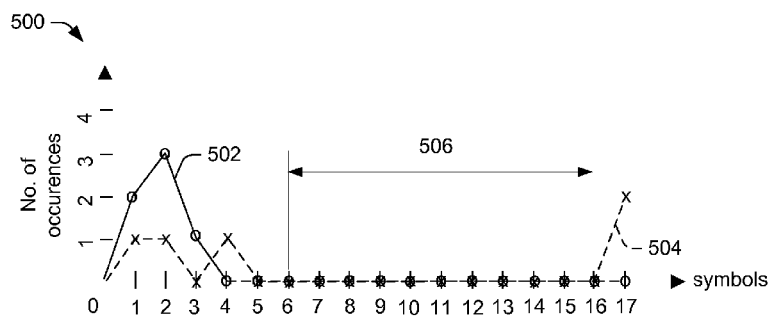
Figure 6:
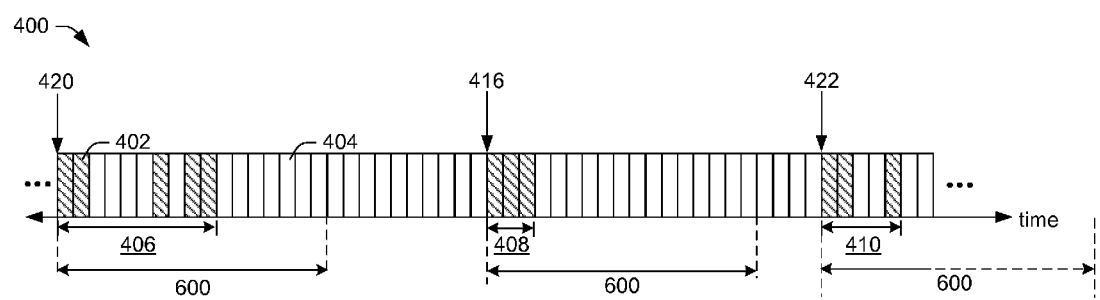
Figure 7:
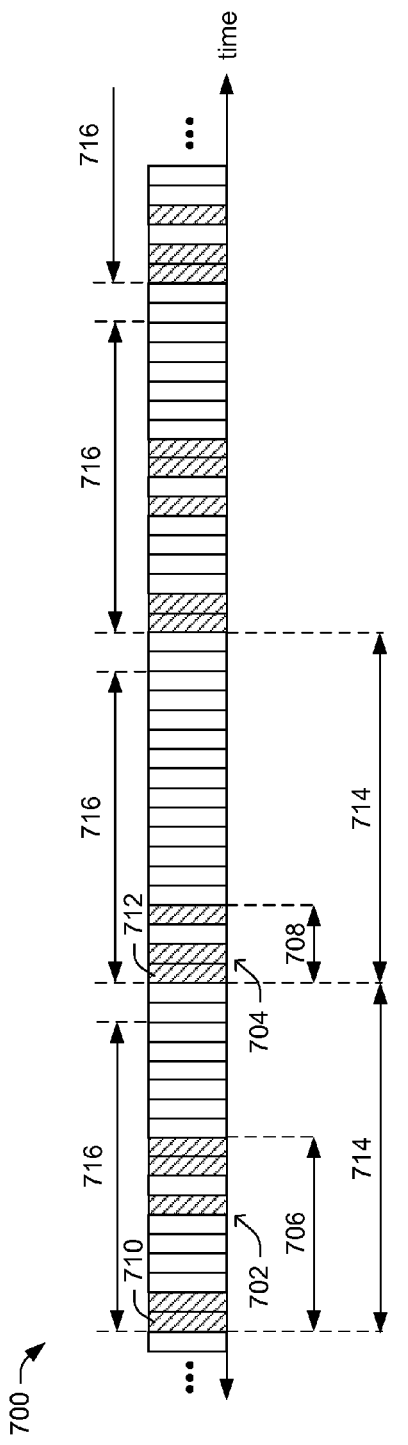
Figure 8:
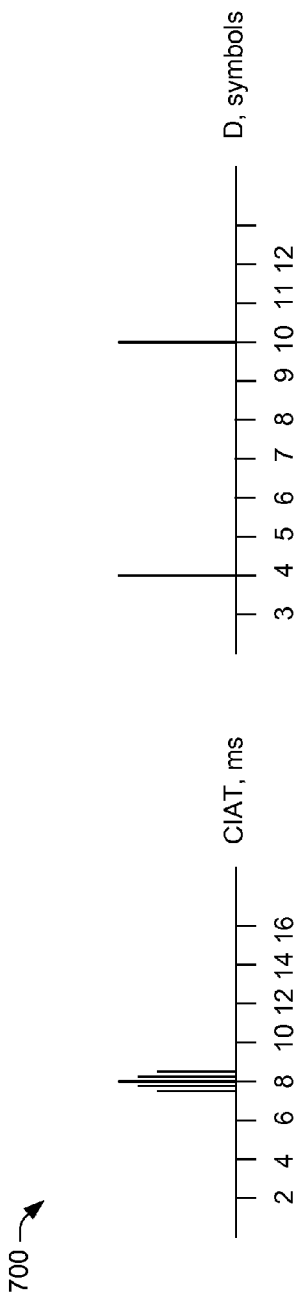
Figure 9:
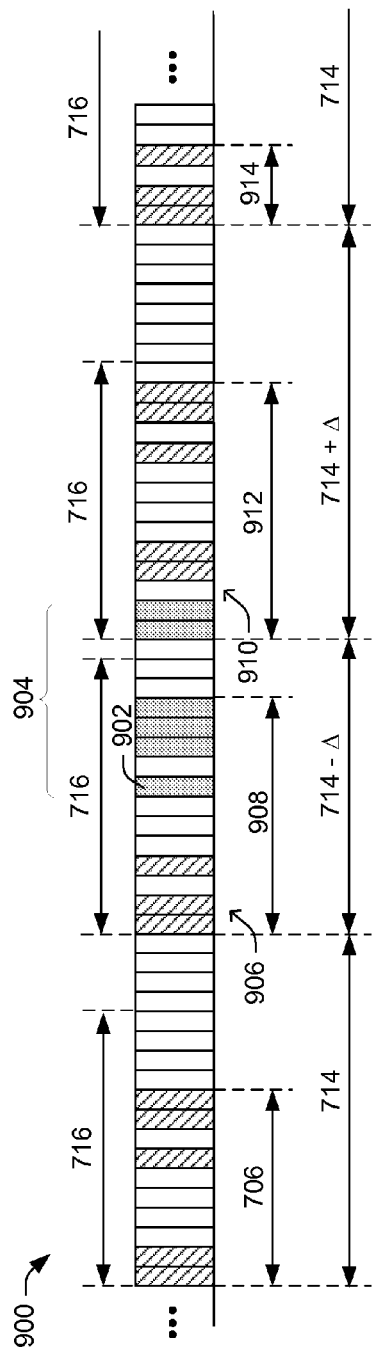
Figure 10:
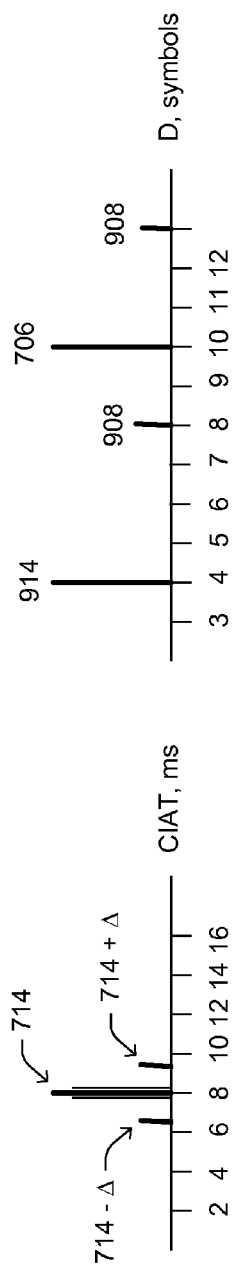

FIG. 1 shows one embodiment of a communication system;
FIG. 2 shows one embodiment of a DSL communication system;
FIG. 3 shows a flow chart illustrating one embodiment of a method for determining at least one cluster parameter;
FIG. 4 shows one embodiment of a stream of symbols having clusters of corrupted symbols therein;
FIG. 5 shows one embodiment of a histogram;
FIG. 6 shows one embodiment of a stream of symbols having clusters of corrupted symbols therein;
FIG. 7 shows one embodiment of a stream of symbols having clusters of corrupted symbols therein;
FIG. 8 shows one embodiment of a histogram;
FIG. 9 shows one embodiment of a stream of symbols having clusters of corrupted symbols therein; and
FIG. 10 shows one embodiment of a histogram.

DETAILED DESCRIPTION

The present invention will now be described with reference to the drawings wherein like reference numerals are used to refer to like elements throughout, and wherein the illustrated structures are not necessarily drawn to scale. Although various illustrated embodiments are described and illustrated as a hardware structure, the functionality and corresponding features of the present system can also be performed by appropriate software routines or a combination of hardware and software. Thus, the present invention should not be limited to any particular implementation and shall be construed to cover any implementation that falls within the spirit and scope of the claims.

Aspects of this invention relate to methods and communication systems for determining a cluster parameter that can be used to calculate proper INP parameters, thereby providing more efficient communication. In various embodiments, network devices monitor a stream of symbols exchanged therebetween and identify clusters of symbols that are severely corrupted by noise bursts, i.e. those symbols where a significant number of sub-carriers are decoded in error. The clusters of corrupted symbols are characterized in accordance with one or more cluster parameters that can be used to determine the INP parameters. These INP parameters can then be used to implement measures to combat the expected impulse noise.

FIG. 1 illustrates one communication system 100 in which one or more aspects of the invention may be implemented, comprising first and second network devices 102 and 104 coupled to a transmission medium 106, wherein data is transferred between the network devices 102, 104 over the transmission medium 106. Generally data is transferred as a stream of symbols over a multi-carrier channel that is supported by the transmission medium. Depending on the implementation, the transmission medium may be wireline (e.g., twisted pair of copper wires, coaxial cable, optical fiber, etc) or wireless (e.g., the atmosphere).

Referring now to FIG. 2, one can see a more detailed embodiment of one type of communication system, namely a digital subscriber line (DSL) communication system 200. The DSL communication system 200 comprises a transmitting modem 202 and a receiving modem 204. A transmission line 206 between the modems 202, 204 typically comprises a phone line such as a twisted copper pair of wires, which supports a multi-carrier channel.

The transmitting modem 202 contains a transmit data source 208, a forward error correction (FEC) encoder 210, an interleaver 212, and a modulator 214. The modulator 214 can also include additional encoder (not shown), such as a Trellis encoder, for instance. The transmitter 202 sends a modulated signal (e.g., a discrete multi-tone (DMT) signal that comprises symbols) over the transmission line 206 towards the receiving modem 204. Each symbol transmitted over the channel is a sum of $N_{SC}$ sub-carriers (also called tones or bins). Each sub-carrier carries a number of data bits modulated onto it.

The receiving modem 204 includes functional blocks for performing the reverse function: a de-modulator 216, a de-interleaver 218, and an FEC decoder 220. The client then receives the data at the receive data source 222. In some applications, data is also scrambled prior to FEC encoding to reduce correlation between elements and de-scrambled after FEC decoding.

The modems 202, 204 are adapted to cooperatively detect and analyze impulse noise (and other types of noise) on the multi-carrier channel by identifying clusters of symbols that are severely corrupted by noise bursts.

To account for errors due to the detected impulse noise, the illustrated modems 202, 204 can simultaneously implement modified INP parameters. For example, these INP parameters can specify how the modems are to reconfigure their FEC encoder/decoder (210, 220) and their interleaver/deinterleaver (212, 218). Usually FEC redundancy bits and interleaver depth are selected so that the system can correct groups of corrupted symbols up to a minimum INP value required for the system.

In this regard, the various components of the communication system and other systems of the invention include suitable circuitry, state machines, firmware, software, logic, etc. to perform the various methods and functions illustrated and described herein, including but not limited to the methods described below. While the methods illustrated below are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the operation of communication systems which are illustrated and described herein (e.g., communication system 100 in FIG. 1 is and DSL communication system 200) as well as in association with other systems not illustrated, wherein all such implementations are contemplated as falling within the scope of the present invention and the appended claims.

A general method 300 in accordance with aspects of the invention is now described. During initialization 302, one network device selects an initial value of INP and computes corresponding initial INP parameters. The initial value of INP could be a default (if no information about the burst noise in the channel is available) or one that takes in account previous experience on this channel. At the completion of the initialization, both network devices enter steady-state data transmission with this initial INP setting. For example, in a DSL communication system, the initial INP parameters could be FEC and interleaver parameters, which one modem can send to the other modem over a management channel of the transmission line. Typically, the initial value of INP will be the number of consecutively corrupted symbols which the modems can correct by using the FEC redundancy bits.

During initialization or during the steady-state transmission, in 304, the network devices monitor received symbols, which include clusters of corrupted symbols therein. These clusters of corrupted symbols could be due to impulse noise (e.g., REIN) or some other type of noise. In 306, the network devices characterize the clusters according to cluster parameter(s) and report the cluster parameter(s) back to management system associated with the network devices.

If the current time (T) is greater than or equal to the observation time (YES at 310), the network devices determine modified INP parameters based on the cluster parameter(s) in 312. In one DSL embodiment, the management system uses the cluster parameter(s) to calculate the proper FEC and/or interleaver settings for the transmission line in both transmission directions (which might be independent). After the management system determines the proper FEC and/or interleaver settings, it can display the setting to the operator for manual system re-initialization, or can undergo an on-line reconfiguration process to modify the FEC and/or interleaver settings without interrupting the communication session.

Several examples for methods of determining the cluster parameter(s) are is now described. In general, the clusters can be described according to the inter-relationships between corrupted and non-corrupted symbols. In various embodiments, the cluster parameters may be expressed in units of the period of one or more symbols (e.g., 10 DMT symbol periods). In other various embodiments, the cluster parameters could be expressed in time units (e.g., 20 ms).

Referring now to FIGS. 4 and 5, one can see one embodiment in which various cluster parameters are used to characterize noise patterns in a stream of symbols 400 transmitted over the transmission medium. Generally speaking, the stream includes two types of symbols: corrupted symbols (e.g., 402) and uncorrupted symbols (e.g., 404). Due to noise on the channel, the corrupted symbols 402 will ultimately be incorrectly decoded when received at a network device. By contrast, the uncorrupted symbols 404 will be correctly decoded when received at the network device.

Notably, the corrupted symbols 402 often appear as clusters (i.e., groups of symbols) in which corrupted symbols tend to be congregated. For example, FIG. 4 shows three clusters: cluster 406, 408, and 410. In one embodiment, the clusters of corrupted symbols can be characterized by any of several cluster parameters, which include, but are not limited to: cluster duration, inter-arrival time between consecutive clusters, the number of corrupted symbols in a cluster (which may also be referred to as "effective impulse length" (EIL)), the number of uncorrupted symbols in a cluster (ILGAP), and error pattern indication field. Several examples of how these cluster parameters can be defined and utilized are set forth below.

In one embodiment illustrated and described in FIG. 4, the system characterizes the clusters according to a minimum duration between clusters. As shown, symbol period 412 (which may also be referred to as an "inter-arrival time") separates cluster 406 from cluster 408. Similarly, symbol period 414 (which may also be referred to as an "inter-arrival time") separates cluster 408 from cluster 410. Both of these symbol periods 412, 414 have a duration that is greater than or equal to a minimum duration between any expected consecutive is clusters in the system.

To facilitate analysis of the clusters 406, 408, and 410, the network devices may use one of various coding schemes. For example, the network devices could use a bitmap where corrupted and uncorrupted symbols correspond to a pattern of binary ones and zeros (e.g., cluster 406 in FIG. 4 could be coded as 1100001011). In another embodiment, the network devices could utilize an array that indicates the number of consecutive corrupted symbols and the number of consecutive uncorrupted symbols (e.g., cluster 406 in FIG. 4 could be coded as 24112). Other coding schemes could also be used. A system operator can analyze the error pattern to remotely identify a number of typical impulse noise sources, and thereby avoid the need to send a technician to the customer premises.

In one embodiment, one or both network devices could a-priori define the minimum duration between clusters. In another embodiment, one or both network devices could determine the minimum duration from on-going impulse noise monitoring. In this embodiment, as the symbol stream is received, the network device can continuously store information related to any clusters of corrupted symbols. The clusters can then be analyzed to determine the minimum duration between clusters.

To determine the start of a cluster in the minimal duration approach, a first corrupted symbol (e.g., 416) is found within the stream of symbols 400, which first corrupted symbol occurs after a first inter-arrival time (e.g., 412), which relates to the minimum duration between consecutive clusters. This first corrupted symbol is assigned as the beginning of the cluster (e.g., 408). Next, a second inter-arrival time (e.g., 414) relating to the minimum duration between clusters is identified. The end of the cluster will be the last corrupted symbol (e.g., 418) before the found second inter-arrival time. FIG. 4 also shows other first corrupted symbols 420, 422, and other last corrupted symbols 424, 426, respectively, that are associated with other clusters 406, 410, respectively. Although not illustrated, note that a cluster could also comprise only a single corrupted symbol.

FIG. 5 shows a schematic histogram 500, which relates to the data stream plotted in FIG. 4, from which the proper minimum duration between clusters can be derived. The histogram 500 shows two curves: first curve 502 represents the total duration of consecutive corrupted symbols (sets) encountered before a non-corrupted symbol is encountered, and second curve 504 represents the inter-arrival times between the sets of consecutive symbols. By comparing the two curves 502 and 504, a range of proper values 506 for the minimum duration between clusters can be found. Note that sets may correspond to clusters, but do not necessarily so correspond.

More specifically, first curve 502 shows that in FIG. 4's symbol stream there are two sets (508, 510) having a single corrupted symbol, three sets (512, 514, 516) having two corrupted symbols, one set (518) having three corrupted symbols, and no sets having four or more corrupted symbols. Second curve 504 shows that there is one inter-arrival time between sets (520) having a duration of one symbol period, one inter-arrival time between sets (522) having a duration of two symbol periods, no inter-arrival times between sets having a duration of three symbol periods, and so on. Notably, a real-world implementation would have many more data points (and likely wider range) than FIG. 5, which is presented in a streamlined manner for purposes of simplicity and clarity. In any event, in one embodiment, a particular minimum duration between clusters can be chosen in a statistically meaningful fashion (i.e., one that provides a sufficient blend of error protection and throughput) from a range of values 506.

In another embodiment now discussed with reference to FIG. 6, the clusters are characterized in accordance with a maximum cluster duration 600. The maximum cluster duration 600 is measured from a first symbol 420, 416, 422, of each respective cluster 406, 408, 410. All of the symbols within the maximum cluster duration 600 are assigned to the cluster. The first corrupted symbol following the maximum cluster duration is assigned as the start of the next cluster. If REIN is present, the maximum cluster duration is typically less than the REIN period.

One advantage of the maximum cluster duration approach is that it can be coupled with FEC settings. More specifically, if the maximum cluster duration is set equal to the FEC codeword span, the number of corrupted symbols in the cluster will relate to the value of the required INP.

In one embodiment, the maximum cluster duration is defined a-priori defined by the management system. In other embodiments, values for the maximum cluster duration can be found as a result of a impulse noise monitoring process and analysis.

In one embodiment, the following formulas can be used to find a range of proper maximum cluster duration (MD) values:

$$avCD = avIAT_s * noIAT_s / noIAT_c + avSL \quad (1)$$

$$avCD < MD < avCD + MDBC \quad (2)$$

where avCD is the average cluster duration, $avIAT_s$ is the average inter-arrival time between sets; $noIAT_i$ is the observed number of inter-arrival times allocated between sets; $noIAT_c$ is the observed number of inter-arrival times allocated to be between clusters; avSL is the average set length; and MDBC is the minimum duration between clusters.

Now that several examples of how to determine a maximum cluster duration parameter have been illustrated, reference is made to FIGS. 7 and 8, which illustrate a noise scenario with REIN. As shown, REIN creates clusters 702, 704 having cluster durations 706, 708, respectively. The first symbol 710, 712 of the clusters 702, 704 are separated by a regular inter-arrival time 714. This inter-arrival time 714 corresponds to the periodicity of the REIN, while the difference in cluster duration (e.g., duration 706 is ten symbols while duration 708 is four symbols) could be due to alternating current (AC). Further, the effective impulse length for the clusters 706, 708 can be characterized as five symbols and three symbols, respectively. In this embodiment the value of the maximum cluster duration 716 is set to be slightly less than the expected REIN period.

FIG. 8 shows the expected histograms of cluster duration (D) and cluster inter-arrival time (CIAT). Therefore, in a DSL communication system experiencing the illustrated noise scenario 700, the FEC settings should cover up to five corrupted symbols distributed over a duration of ten symbol periods, with an FEC codeword span that is less than approximately 8 ms.

Referring now to FIGS. 9 and 10, one can see another scenario 900 in which REIN is present in combination with SHINE. SHINE results in a group of corrupted symbols 902 having a span 904, which unlike clusters of symbols caused by REIN do not necessarily occur at regularly occurring intervals. Thus, the combination of REIN and SHINE can cause clusters that have durations that are "skewed" from the expected durations. For example, in FIG. 9, cluster 906, which is defined by the symbols within maximum duration 716, has a duration 908 that includes some corrupted symbols from SHINE. Further, the SHINE corrupted symbols cause cluster 910 to start prematurely relative to the REIN corrupted symbols. Thus, clusters 906 and 908 have periods that are "skewed" relative to one another by an amount Δ.

In order to account for the amount Δ, histograms can again be used. In one embodiment, SHINE is present if the inter-arrival time between relatively short sets is longer than inter-leaver delay and the sets duration, where each set has a duration that is less than the interleaver delay. In such a scenario, the maximum cluster duration may be greater than the expected cluster duration, but is less than or equal to the interleaver delay. In addition, the FEC settings should cover up to $EIL_{max}$ corrupted symbols distributed over the maximum cluster duration, where the FEC codeword span exceeds the maximum cluster duration.

Long SHINE is a particular type of SHINE with relatively long sets interspersed among many short sets. A long cluster may be captured as several consecutive clusters having cluster durations approximately equal to the inter-arrival time (i.e., close to maximum cluster duration). With long SHINE clusters, the captured maximum values of EIL for specific clusters may not represent the maximum number of corrupted symbols during some FEC codeword spans. The problem may be solved by accumulating and analyzing several clusters. An inter-arrival time-histogram of Long SHINE can be identified by rare components which are relatively close to D, while the majority of inter-arrival time values are much larger than the maximum cluster duration. Values of maximum cluster duration which are slightly longer than typical cluster duration may provide more accurate information on protection from long clusters.

In one embodiment the following parameters can be reported: cluster inter-arrival time, EIL or the number of corrupted symbols in the cluster (separate count for every value of EIL detected during the observation time), duration of the cluster (separate count for every value of cluster duration detected during the observation time), and ILGAP, which relates to the duration of a cluster (D) and of the number of corrupted symbols (EIL) within that cluster. For a given cluster: ILGAP=D–EIL. For example, in an embodiment where non-corrupted symbols are continually transmitted between clusters of corrupted symbols, ILGAP could equal the number of non-corrupted symbols between clusters.

In one embodiment, to derive a proper FEC setting, the duration of the cluster which carries the maximum value of EIL should be known. To resolve this issue ILGAP can be reported in direct relation to the specific value of EIL.

Several methods to represent ILGAP could be used. In one embodiment a histogram of ILGAP could be used. In another embodiment, values of ILGAP (e.g., minimum, maximum, both, etc.) could be selected by one or both network devices To illustrate the usage of the mentioned reported parameters, several examples are now set forth.

In one example where the clusters are of consecutive corrupted symbols, D=EIL=IL and ILGAP=0. A suggested value for the minimum INP setting would be $EIL_{max}$.

In another example, relatively big clusters include consecutive corrupted symbols, while small clusters include uncorrupted symbols. For the large clusters, D=EIL=IL, and ILGAP=0. For the small clusters (D<Dmax), D>EIL, ILGAP>0. A suggested setting for the minimum INP setting would be $EIL_{max}$.

In another example, all clusters have uncorrupted symbols. In one embodiment, a suggested value for the minimum INP setting would be max(EIL+ILGAP)=Dmax. In another embodiment, a suggested value for the minimum INP setting would be EILmax+Δ, where Δ is selected based on specific considerations, like average versus worst case, distribution of FEC bytes over DMT symbols, and others.

Although the invention has been illustrated and described with respect to one or more implementations, alterations and/or modifications may be made to the illustrated examples without departing from the spirit and scope of the appended claims. In particular regard to the various functions performed by the above described components or structures (blocks, units, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method of monitoring impulse noise, comprising:
    characterizing a number of solely non-overlapping clusters of symbols in a stream of symbols in accordance with a cluster parameter, where the non-overlapping clusters of symbols include a number of corrupted symbols wherein the cluster parameter identifies the number of corrupted symbols associated with the cluster;
    deriving an impulse noise protection parameter from the cluster parameter as a function of an observation time; and
    periodically updating the impulse noise protection parameter as a function of the observation time,
        where the cluster parameter is a multi-bit value having a pattern of binary ones and zeros, where the pattern of binary ones and zeros corresponds to a pattern of corrupted and uncorrupted symbols in the cluster, or
        where the cluster parameter employs a coding scheme indicating a number of consecutive corrupted symbols and a number of consecutive uncorrupted symbols.

2. The method of claim 1, where the number of non-overlapping clusters are respectively characterized by the cluster parameter as a function of an observation time.

3. The method of claim 1, where the impulse noise protection parameter relates to at least one of: interleaving or forward-error-correction.

4. A method of monitoring impulse noise, comprising identifying clusters of corrupted symbols in a stream of symbols in accordance with a cluster parameter related to a minimum duration between clusters of corrupted symbols, wherein identifying the clusters of corrupted symbols in accordance with the minimum duration between clusters comprises:
    finding a first symbol period relating to the minimum duration in the stream of symbols having no corrupted symbols therein;
    establishing a beginning of a cluster at a first corrupted symbol after the found first symbol period;
    finding a second symbol period relating to the minimum duration in the stream of symbols having no corrupted symbols therein; and
    establishing an end of the cluster at a last corrupted symbol before the found second symbol period.

5. The method of claim 4, wherein the minimum duration between clusters is defined a-priori within a management system.

6. The method of claim 4, wherein the minimum duration between clusters is derived from a plurality of previously transmitted block lengths of corrupted symbols and inter-arrival times associated therewith.

7. The method of claim 4, where the method is carried out in accordance with at least one digital subscriber line (DSL) communication standard.

8. A method of monitoring impulse noise, comprising:
identifying clusters of corrupted symbols in a stream of symbols in accordance with a cluster parameter related to a maximum duration of a cluster, wherein identifying a cluster of corrupted symbols comprises:
finding a first corrupted symbol in the stream of symbols;
assigning the first corrupted symbol to the start of a first cluster; and
assigning a predetermined number of consecutive symbols immediately after the first corrupted symbol to the first cluster, wherein the predetermined number of symbols corresponds to the maximum cluster duration.

9. The method of claim 8, wherein the maximum duration of the cluster is defined a-priori within a management system.

10. The method of claim 8, wherein the maximum duration of the cluster is greater than an average cluster duration and less than the sum of the average cluster duration and a minimum duration between clusters.

11. The method of claim 8, further comprising:
finding a second corrupted symbol in the stream of symbols, wherein the second corrupted symbol is the next corrupted symbol after the predetermined number of consecutive symbols;
assigning the second corrupted symbol to the start of a second cluster; and
assigning the predetermined number of symbols immediately after the second corrupted symbol to the second cluster.

12. A network device, comprising:
a receiver configured to receive a stream of symbols over a multi-carrier channel supported by a transmission medium;
where the receiver is configured to characterize a number of solely non-overlapping clusters of symbols in the stream of symbols in accordance with a cluster parameter, where the solely non-overlapping clusters of symbols include a number of corrupted symbols and wherein the cluster parameter identifies the number of corrupted symbols associated with the cluster,
where the cluster parameter is a multi-bit value having a pattern of binary ones and zeros, where the pattern of binary ones and zeros corresponds to a pattern of corrupted and uncorrupted symbols in the cluster.

13. The network device of claim 12, where the receiver is configured to support at least one digital subscriber line (DSL) communication standard.

14. A method of monitoring impulse noise, comprising identifying clusters of corrupted symbols in a stream of symbols in accordance with a cluster parameter related to a minimum duration between clusters of corrupted symbols, wherein identifying a cluster of corrupted symbols comprises:
finding a first symbol period having no corrupted symbols therein, wherein the first symbol period has a total duration that is greater than or equal to the minimum duration;
finding a second symbol period spaced apart from the first symbol period and having no corrupted symbols therein, wherein the second symbol period has a total duration that is greater than or equal to the minimum duration; and
assigning a number of consecutive symbols disposed between the first and second symbol periods to the cluster of corrupted symbols, wherein the number of consecutive symbols includes at least one corrupted symbol therein.

\* \* \* \* \*